(12) United States Patent  
Fayerman et al.

(10) Patent No.: US 6,681,516 B2
(45) Date of Patent: Jan. 27, 2004

(54) FISH ROD HOLDER WITH AUTOMATIC TRIGGER

(76) Inventors: Vitaliy Fayerman, 1201 N. Mansfield Ave., Apt. 306, Los Angeles, CA (US) 90038; Mark Faerman, 135 N. Hayworth #302, Los Angeles, CA (US) 90038; Victoria Bezman, 7060 Hollywood Blvd., Suite 308, Los Angeles, CA (US) 90038

( * ) Notice: Subject to any disclaimer, the term of this patent is extended or adjusted under 35 U.S.C. 154(b) by 0 days.

(21) Appl. No.: 10/136,512

(22) Filed: May 1, 2002

(65) Prior Publication Data

US 2002/0162270 A1 Nov. 7, 2002

Related U.S. Application Data (63) Continuation-in-part of application No. 09/643,251, filed on Dec. 15, 2000.

(51) Int. Cl.[7] .................................. A01K 97/11
(52) U.S. Cl. .......................................... 43/15
(58) Field of Search ........................ 43/15, 16

(56) References Cited

U.S. PATENT DOCUMENTS

| 2,918,746 | A | * | 12/1959 | Hamrick | 43/15 |
| 3,412,499 | A | * | 11/1968 | Pastrovich, Sr. | 43/15 |
| 3,914,894 | A | * | 10/1975 | Kobza | 43/15 |
| 4,397,113 | A | * | 8/1983 | Pinson | 43/15 |
| 4,730,408 | A | * | 3/1988 | Miller | 43/15 |
| 5,359,802 | A | * | 11/1994 | Gutierrez | 43/16 |
| 5,903,998 | A | * | 5/1999 | Hawkins et al. | 43/15 |
| 6,050,019 | A | * | 4/2000 | Anderson | 43/15 |
| 6,301,820 | B1 | * | 10/2001 | Rosa | 43/15 |
| 6,336,287 | B1 | * | 1/2002 | Lobato | 43/16 |

* cited by examiner

Primary Examiner—Charles T. Jordan
Assistant Examiner—Kimberly S. Smith
(74) Attorney, Agent, or Firm—Blakely, Sokoloff, Taylor & Zafman (57) ABSTRACT

A fish catching device for signaling to a fisherman that a fish bite has occurred using a conventional fishing rod. The device comprise of tubular rod holder attached to a spring-loaded u channel table for receiving the handle of a fishing rod. The device is set up through use of a safety bracket, which is released, after device is cocked through use of extendable latch trigger, which released when a line jerk produced by a fish strike.

5 Claims, 9 Drawing Sheets

FIG. 6D

FISH ROD HOLDER WITH AUTOMATIC TRIGGER

RELATED APPLICATIONS

This application is a continuation-in-part of application Ser. No. 09/643,251, filed on Dec. 15, 2000.

FIELD OF THE INVENTION

The present invention relates to fishing devices, and more particularly to a fishing rod holder with an automatic trigger.

BACKGROUND OF THE INVENTION

Fishing rigs have been in use for years. Various trappable fishing rod holders have therefore been suggested. However, the prior art fishing rod holders are typically complex and ineffective. Therefore, an improved fishing rod holder device is needed.

SUMMARY OF THE INVENTION

A fishing device for signaling to a fisherman that a fish bite has occurred is described. The device includes a vertical metal stake, a mounting plate attached to the top portion of the metal stake at a generally perpendicular angle, a tubular rod holder pivotally attached to the mounting plate, an extendable spring connecting the tubular rod holder with the vertical metal stake, a safety bracket whose longer end is attached to the top portion of the metal stake, and a latch-trigger pivotally attached to the right side of the mounting plate. In its unloaded state, the tubular rod holder is positioned vertically, next to the mounting plate. The fishing device is set up by inserting a fishing rod handle into the tubular holder, pressing the tubular holder against the tension of the spring, and placing the safety bracket over the tubular holder temporarily when the tubular holder moves into a horizontal position. The safety bracket is released after the latch-trigger is placed over the tubular holder. Next, the fisherman enters the fishing line pulled from the reel into a groove in the top portion of the latch-trigger. The latch trigger is released in response to a line jerk produced by a fish strike.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

In the following detailed description of the present invention, numerous specific details are set forth in order to provide a thorough understanding of the present invention. However, it will be apparent to one skilled in the art that the present invention may be practiced without these specific details.

Figure 1:
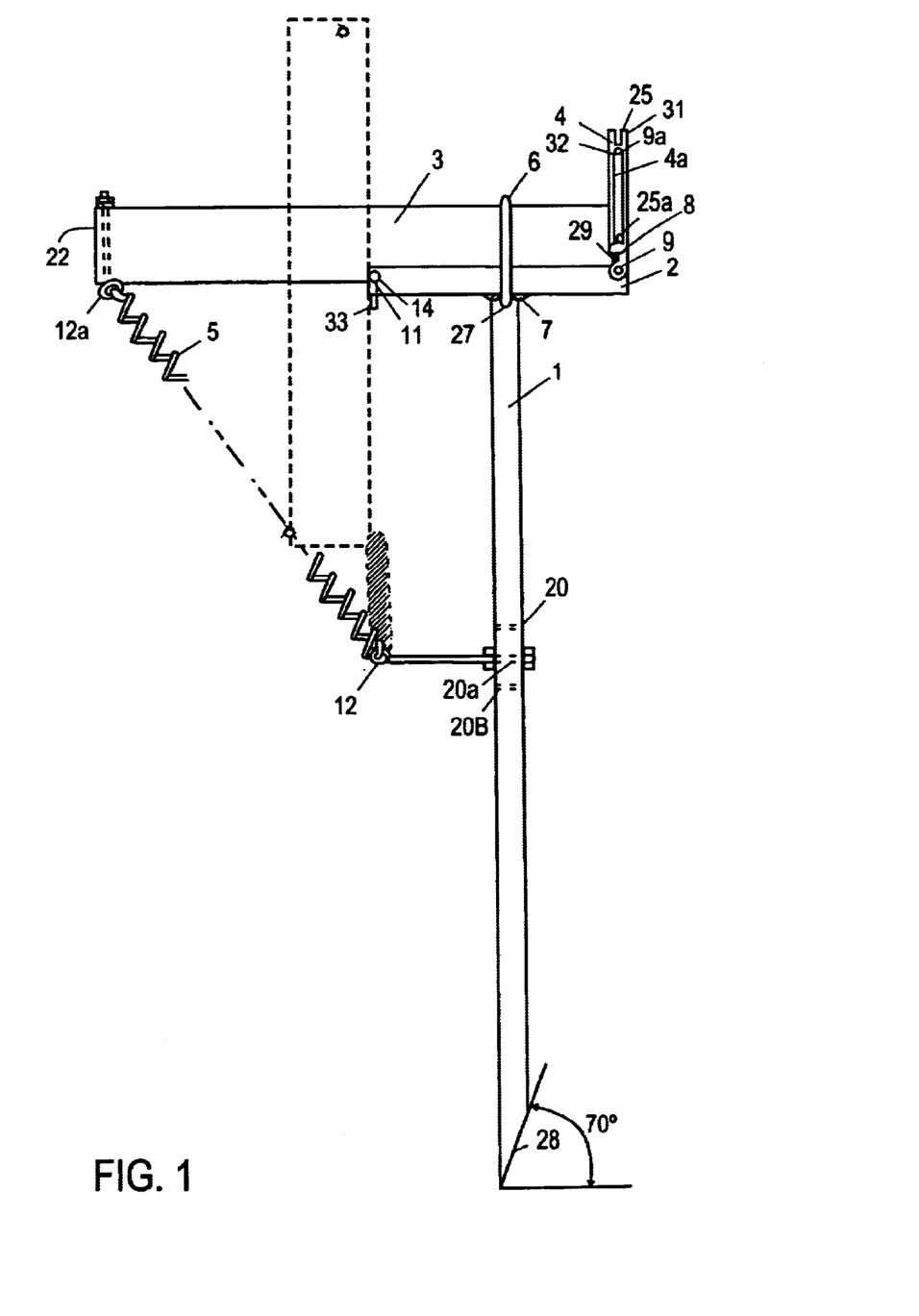
FIG. 1 illustrates one embodiment of a fishing rod holder with an automatic quick trigger in a loaded state.

FIG. 1 illustrates one embodiment of a fishing rod holder with an automatic quick trigger in a loaded state.

Referring to FIG. 1, the fishing rod holder includes a metal stake 1, a tubular fishing rod holder 3, a spring 5, a safety bracket 6, a latch-trigger 4, and a mounting plate 2.

One end of the spring 5 is attached to the metal stake 1. In one embodiment, the spring 5 is attached to one of three holes (i.e., holes 20, 20a and 20b located on the metal stake 1 at various levels) using a bolt 12. The selection of the hole depends on the desired sensitivity of the fishing line. For example, the attachment of the spring 5 to the lower hole 20b provides a higher tension and may be used for a large size fish, the attachment to the middle hole 20a provides a medium spring tension and may be used when an average line sensitivity is required, and the attachment to the upper hole 20 provides a lower tension and may be used for small fish (e.g., ¼ lb.).

The other end of the spring 5 is attached to the tubular holder 3 using a bolt 12a inserted into a through hole 22 in the tubular holder 3. When the tubular holder 3 is pressed toward the mounting plate 2 and moves from a vertical position into a horizontal position, the spring 5 is extended to allow this movement. The tubular holder 3 is kept in the horizontal position by the latch-trigger 4 as will be discussed in more detail below.

In one embodiment, the bolt 12a attaching the spring 5 to the tubular holder 3 is small and the bolt 12 attaching the spring 5 to the metal stake is large (e.g., has an eye hook of 6" in length) to ensure desired positioning of the tubular holder 3.

The metal stake 1 is a vertical support member of the fishing rod holder. In one embodiment, the metal stake 1 has a slanted cut off bottom end 28 (e.g., the angle may be equal to 70°) to force the metal stake 1 into the ground (e.g., 8 to 10 inches) at the bank of the water front. Alternatively, the metal stake 1 may be installed on the ice or fixed to a boat. The metal stake 1 has a hole 27 for attaching the safety bracket 6.

The safety bracket 6 is shown in FIG. 1 in its loaded state when it is placed over the tubular holder 3. Dotted lines illustrated the positioning of the tubular holder 3 when the safety bracket 6 is in the unloaded state. The safety bracket 6 is used to temporarily hold the tubular holder 3 in a horizontal position until the latch-trigger 4 is placed over the tubular holder 3 to provide fixed horizontal positioning of the tubular holder 3. The safety bracket 6 may be manufactured from a steel semicircular or circular strip or steel wire that is bent to form an asymmetric arch with a longer end and a shorter end. Electric welding 7 attaches a steel ring-stopper to the longer end of the safety bracket 6.

The tubular holder 3 is a tube used to hold the handle of the fishing rod. The right portion of the tubular holder has a hole to which a hook 8 is welded via electric welding. The hook 8 is used to attach the latch-trigger 4. In one embodiment, the tubular holder 3 has an angle of rotation equal to 90 degrees, thereby providing the fisherman with the instant under-cutting and pulling a large amount of the fishing line. The length of the fishing line, which is pulled out of the water, depends on the length of the fishing rod.

The mounting plate 2 is attached to the metal stake 1 via welding 7. The left end of the mounting plate 2 has a hole 14 for a bolt 11 that attaches the mounting plate 2 to the tubular holder 3. The right end of the mounting plate 2 has a hole for a bolt 9 that attaches the latch-trigger 4. In one embodiment, the bottom side of the mounting plate 2, close to its left end, has an unbend-stopper 33 that keeps the tubular holder 3 in a perpendicular position with respect to the mounting plate 2 when the safety bracket 6 is in the unloaded state. The unbend-stopper 33 prevents injury of the fisherman hands if device accidentally discharges during loading.

In one embodiment, the latch-trigger 4 is a steel rectangular plate. The bottom part of the plate 4 is rounded and has a hole for the bolt 9 that attaches the latch-trigger 4 to the mounting plate 2. Above this hole, there is a rectangular cut out 29 that is used for connection with the round hook 8. The top of the plate 4 has a groove 25 to hold the fish line. The fish line is placed into the groove 25 after the devise is loaded. In one embodiment, the edges of the groove 25 are smooth.

Figure 4:
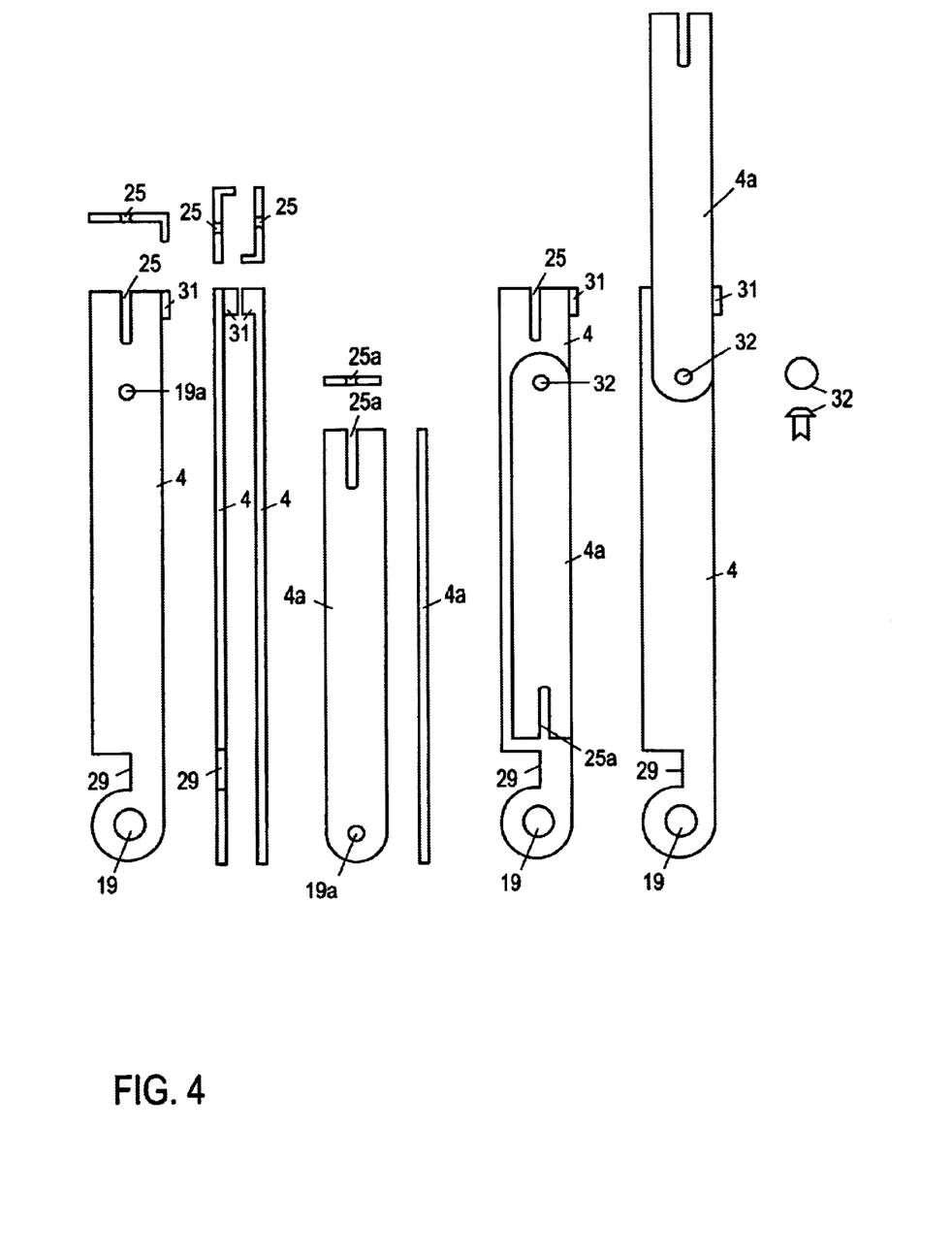
FIG. 4 illustrates one embodiment of a latch-trigger of a fishing rod holder.

In another embodiment, the latch-trigger 4 consists of two steel rectangular plates (i.e., plates 4 and 4a) connected to each other via a rivet 32. The first plate 4 has a hole 19a below the groove 25 for the rivet 32 that holds the first plate 4 and the second plate 4a together. The top end of the first plate 4 has an unbend-stopper 31 that is used to hold the second plate in a vertical position. The bottom end of the second plate 4a is rounded and has a hole 19a for the rivet 32. The top end of the second plate 4a has a groove 25a. The edges of the groove 25a may be smooth. As shown in FIG. 1, the plates 4 and 4a may kept in a folded position (i.e., the second plate 4a is positioned along the first plate 4, with the groove 25a being at the bottom of the second plate 4a). As will be further discussed in conjunction with FIG. 4, if a need to increase the sensitivity of the latch-trigger 4 arises, the second plate 4a is raised upwards (until it hits the unbend-stopper 31) and the groove 25a becomes at the top of the second plate 4a, as shown in FIG. 4. This increases the length of the latch-trigger 4. The extended latch-trigger 4 allows for catch of smaller fish (e.g., ⅛ lb.).

Figure 2:
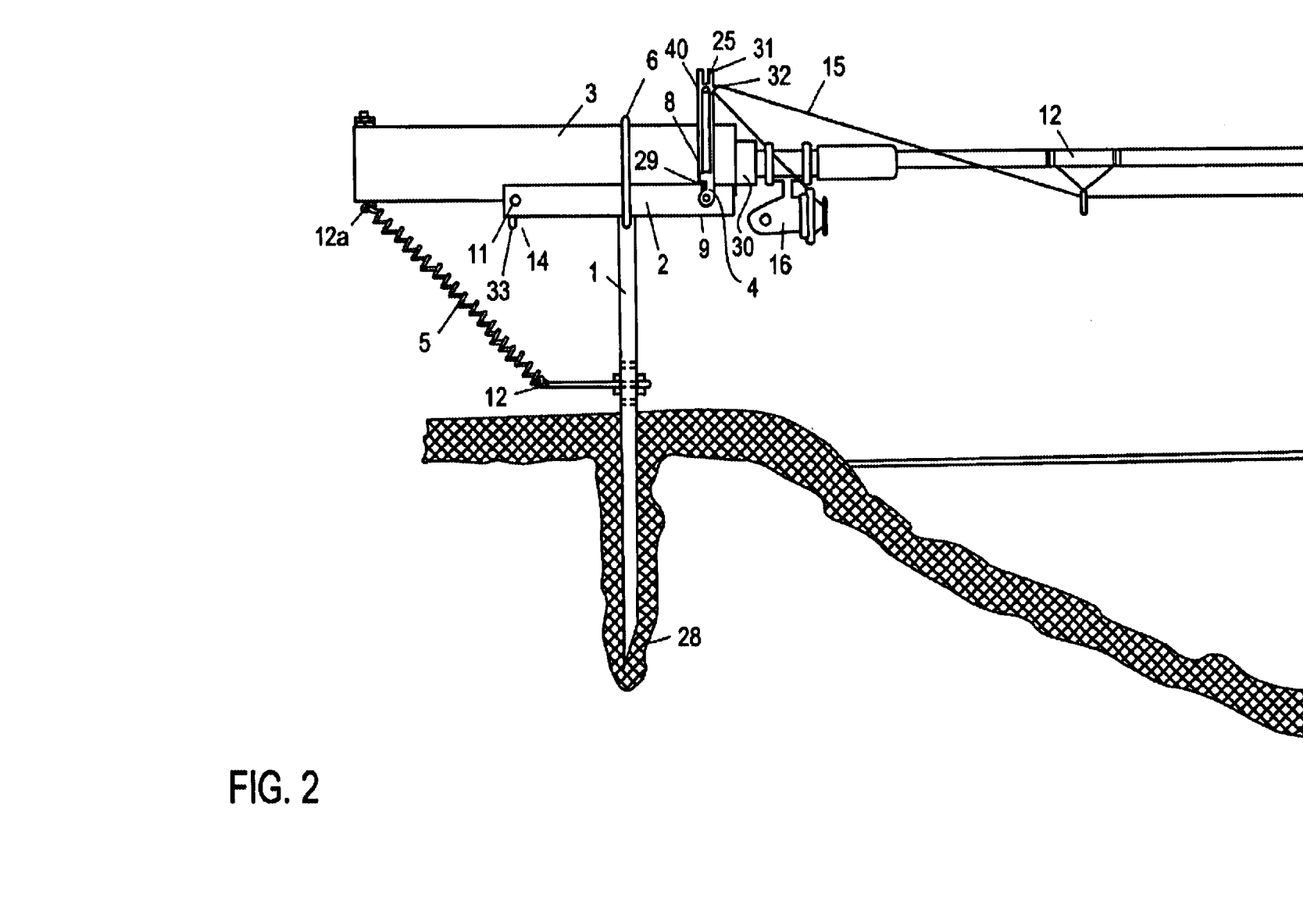
FIG. 2 illustrates one embodiment of a fishing rod holder placed on a coast of a reservoir in a charged condition.

FIG. 2 illustrates one embodiment of a fishing rod holder placed on a coast of a reservoir in a charged condition. The fishing rod holder may be installed by the fisherman directing the metal stake 1 into the ground (e.g., 8 to 10 inches) with its slanted cut-off end 28, pressing the mounting plate 2 with a hand, and turning the metal stake 1 in different directions around its axle. Then, the fisherman may insert a handle 30 of a fishing rod 17 into the tubular holder 3 and press the tubular holder 3 toward the mounting plate 2 with one hand. When the tubular holder 3 is moved into a horizontal position, thus extending the spring 5, the fisherman may temporarily secure the tubular holder 3 in the horizontal position by placing the safety bracket 6 over the tubular holder 3. Next, the fisherman may take the latch-trigger 4 with the other hand and place the cut out 29 over the hook 8. Further, the fisherman may pull the fishing line 15 from the reel 16 and enter it into the groove 25 of the latch-trigger 4. Afterwards, the fisherman may take the safety bracket 6 off the tubular holder 3. Now, the latch-trigger 4 becomes sensitive to movements of the fishing line 15.

In one embodiment, the fishing rod holder may accommodate both a left-handed fisherman and a right-handed fisherman by attaching safety bracket 6 and the latch-trigger 4 to the holes and pins available on both sides of the metal stake 1 and the tubular holder 3.

Figure 3:
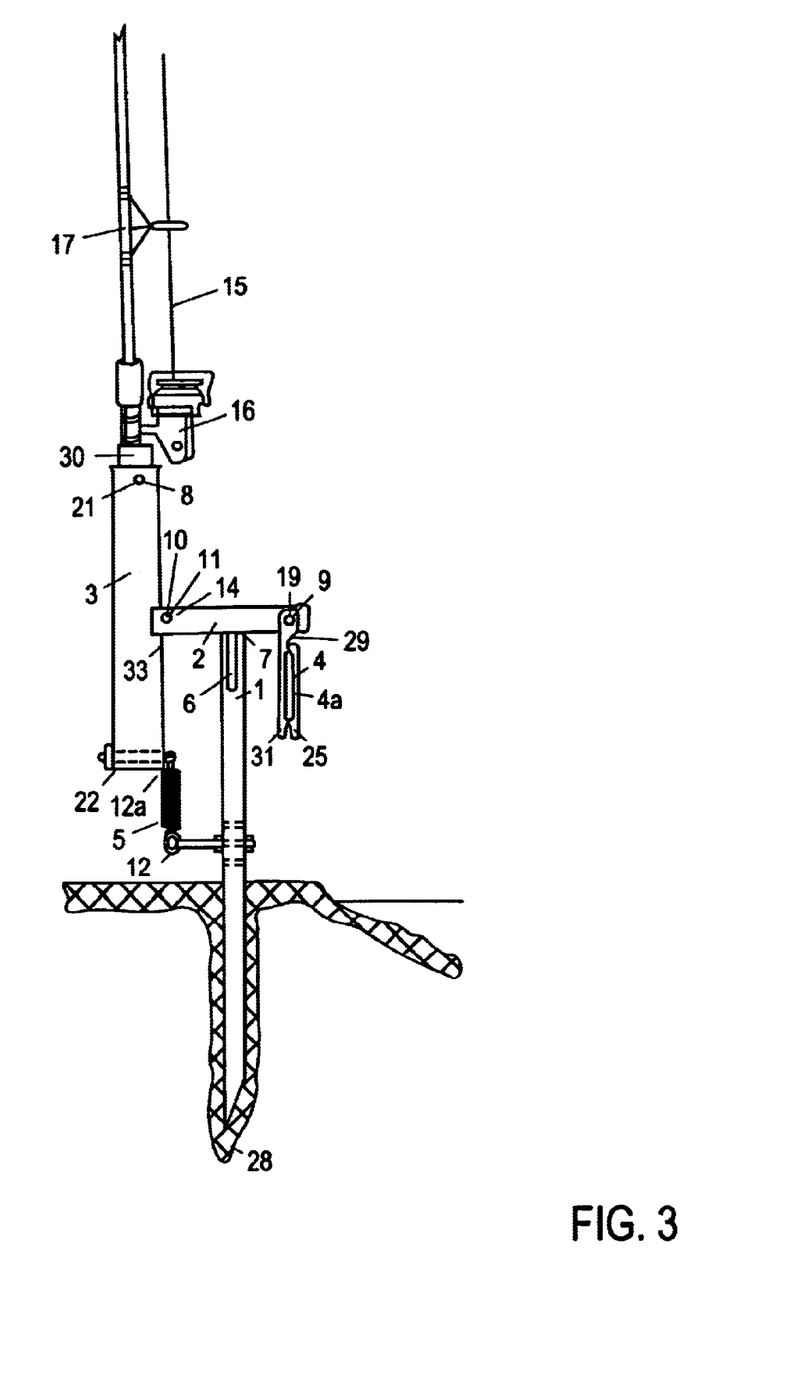
FIG. 3 illustrates one embodiment of a fishing rod holder in a discharged/upward position.

FIG. 3 illustrates one embodiment of a fishing rod holder in a discharged/upward position. As the fish takes the bait and pulls or tags the fishing line 15, the latch-trigger 4 jumps off the hook 8 on the tubular holder 3 and frees out the tubular holder 3 which quickly moves into a vertical position under the tension of the compressed spring 5. During this movement, the tubular holder 3 and the fishing rod 17 whose handle 30 is inserted into the tubular holder 3 are raised 90 degrees up, passing a short, strong pull to the fish line 15 which secures the hook in the fish. When the tubular holder 3 moves into a vertical position, it hits the unbend-stopper 33 of the mounting plate 2, and the sound of a metal click occurs. This sound, in addition to the rocking of the fishing rod that is caused by the fish, signals the fisherman that the fish has been caught.

FIG. 4 illustrates one embodiment of a latch-trigger 4 of a fishing rod holder. The latch-trigger 4 consists of two steel rectangular plates 4 and 4a connected to each other via a rivet 32. The plate 4 may be 5.5" in length, ½" in width, and ⅛" in thickness. The bottom part of the plate 4 is rounded (e.g., with the radius of ¼") and has a hole in the center of the resulting circle for a bolt that attaches the latch-trigger 4 to the mounting plate 2. Above this hole, there is a rectangular cut out 29 (e.g., ⅞" by 5/16) that is used for connection with a hook of the tubular holder 3. The top of the plate 4 has a groove 25 (e.g., with the width of 1/16" and the length of ½") to hold the fish line. The plate 4 has a hole 9a below the groove 25 (e.g., ¾" from the top end of the first plate 4) for the rivet 32 that holds the plates 4 and 4a together. The top portion of the plate 4 is unbent on the right side to form an unbend-stopper 31 (e.g., ¼ by 3/16") that is used to hold the second plate 4a in a vertical position.

The second plate 4a may be 4" in length, ⅜" in width and 1/16" in thickness. The bottom end of the second plate 4a is rounded (e.g., with the radius of ¼") and has a hole 19a (e.g., ⅛" in diameter) for the rivet 32. The top end of the second plate 4a has a groove 25a. The edges of the groove 25a may be polished. The plates 4 and 4a may kept in a folded position (i.e., the second plate 4a is positioned along the first plate 4, with the groove 25a being at the bottom of the second plate 4a). If a need to increase the sensitivity of the latch-trigger 4 arises, the second plate 4a is raised upwards (until it hits the unbend-stopper 31) and the groove 25a becomes at the top of the second plate 4a. This increases the length of the latch-trigger 4. With the exemplary sizes given above, the length of the latch-trigger 4 is extended by 2.5" up to 8.5". The extended latch-trigger 4 allows for catch of small fish (e.g., ⅛ lb.).

Figure 5:
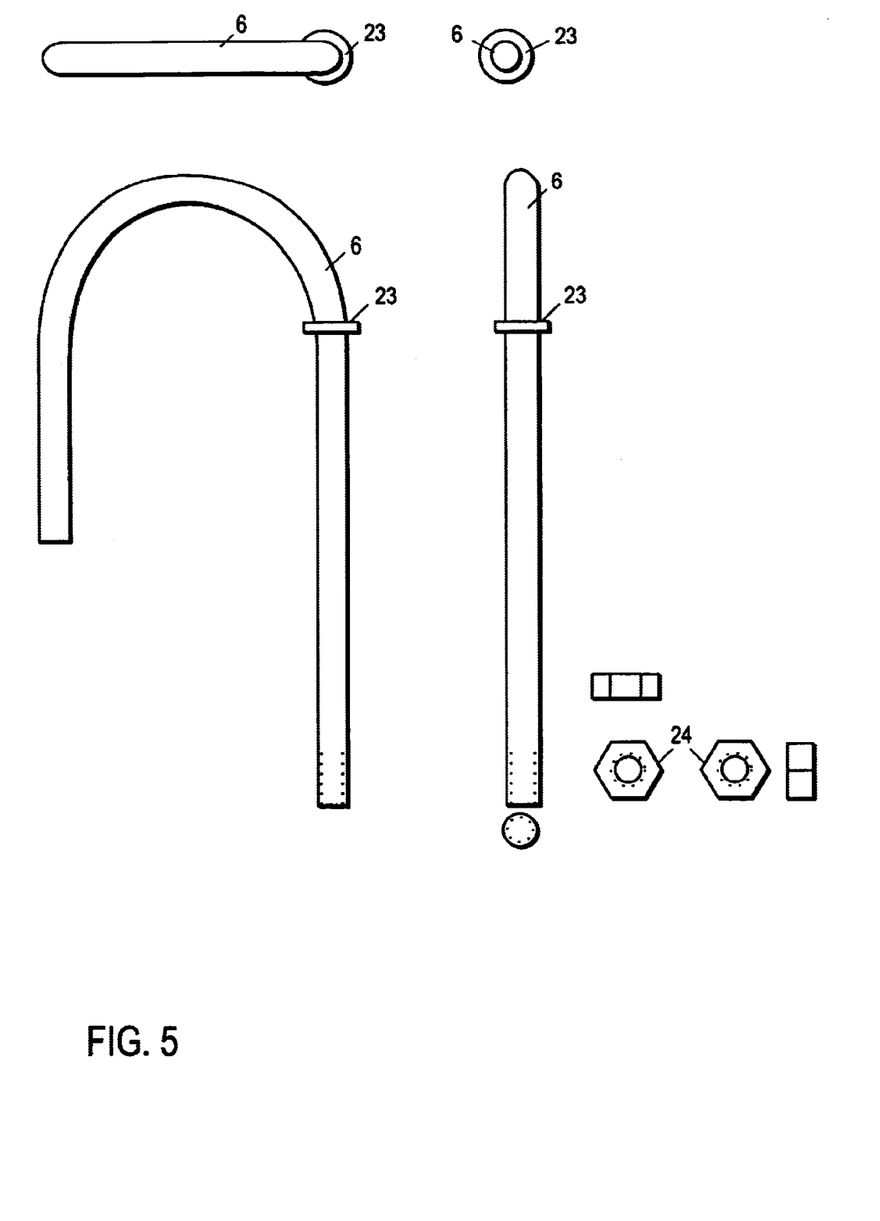
FIG. 5 illustrates one embodiment of a safety bracket of a fishing rod holder.

FIG. 5 illustrates one embodiment of a safety bracket 6 of a fishing rod holder. The safety bracket 6 is a steel semicircular or circular strip or steel wire (e.g., ¼" in diameter and 11" in length) that is bent to form an asymmetric arch (e.g., with the arch radius of 1.375") with a longer end (e.g., 4.5" in length) and a shorter end (e.g., 2" in length). The longer end has carving (e.g., ½" in length) for a nut 24. Electric welding 7 attaches a steel ring-stopper 23 (e.g., 5/16" in diameter and ⅛" in width) to the longer end of the safety bracket 6.

Figure 6A:
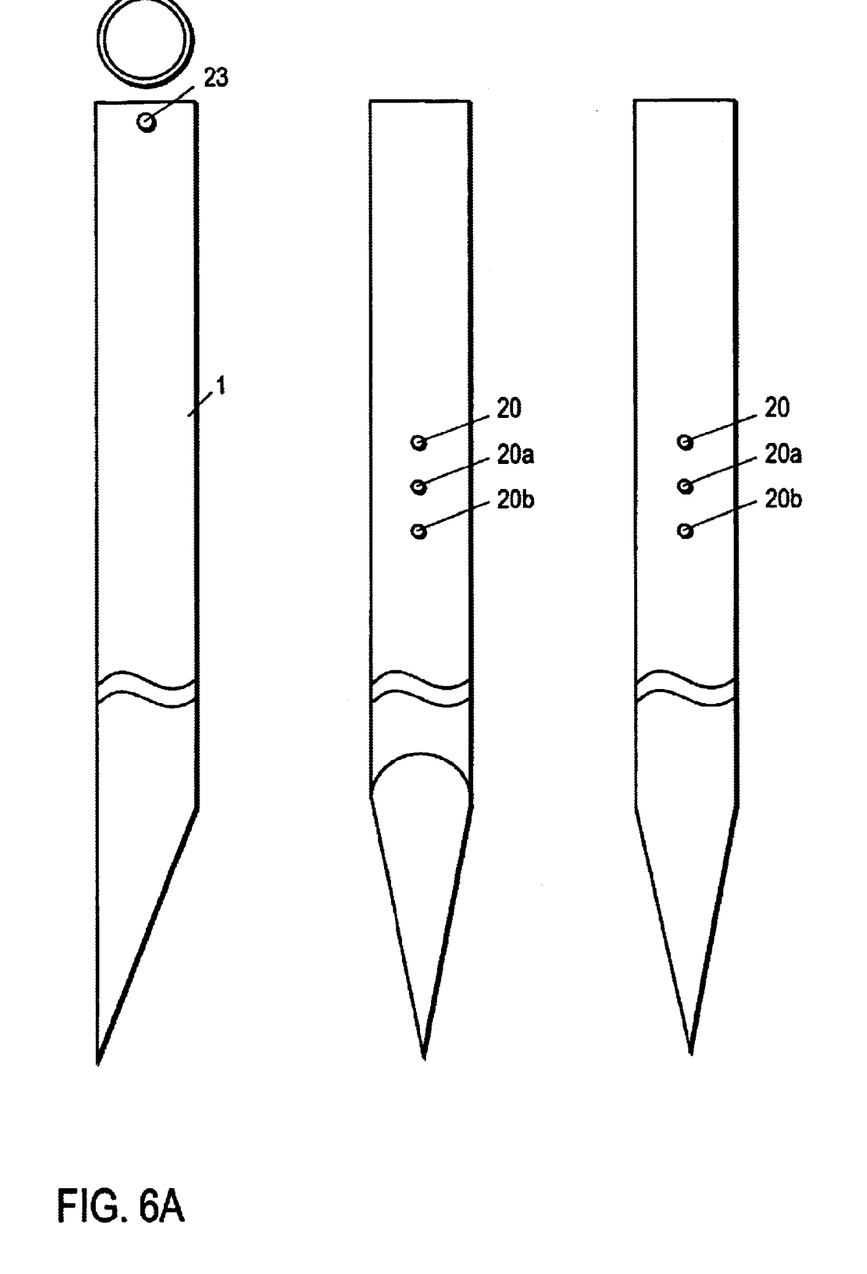
FIG. 6a illustrates one embodiment of a metal stake of a fishing rod holder.

FIG. 6a illustrates one embodiment of a metal stake 1 of a fishing rod holder. The metal stake 1 may be manufactured from a zinced steel tube. The diameter of the tube may be 1" and the length of the tube may be 27". The metal stake 1 has a hole 27 (e.g., diameter 5/16") for attaching the safety bracket 6 and holes 20, 20a and 20b for attaching the spring 5.

Figure 6B:
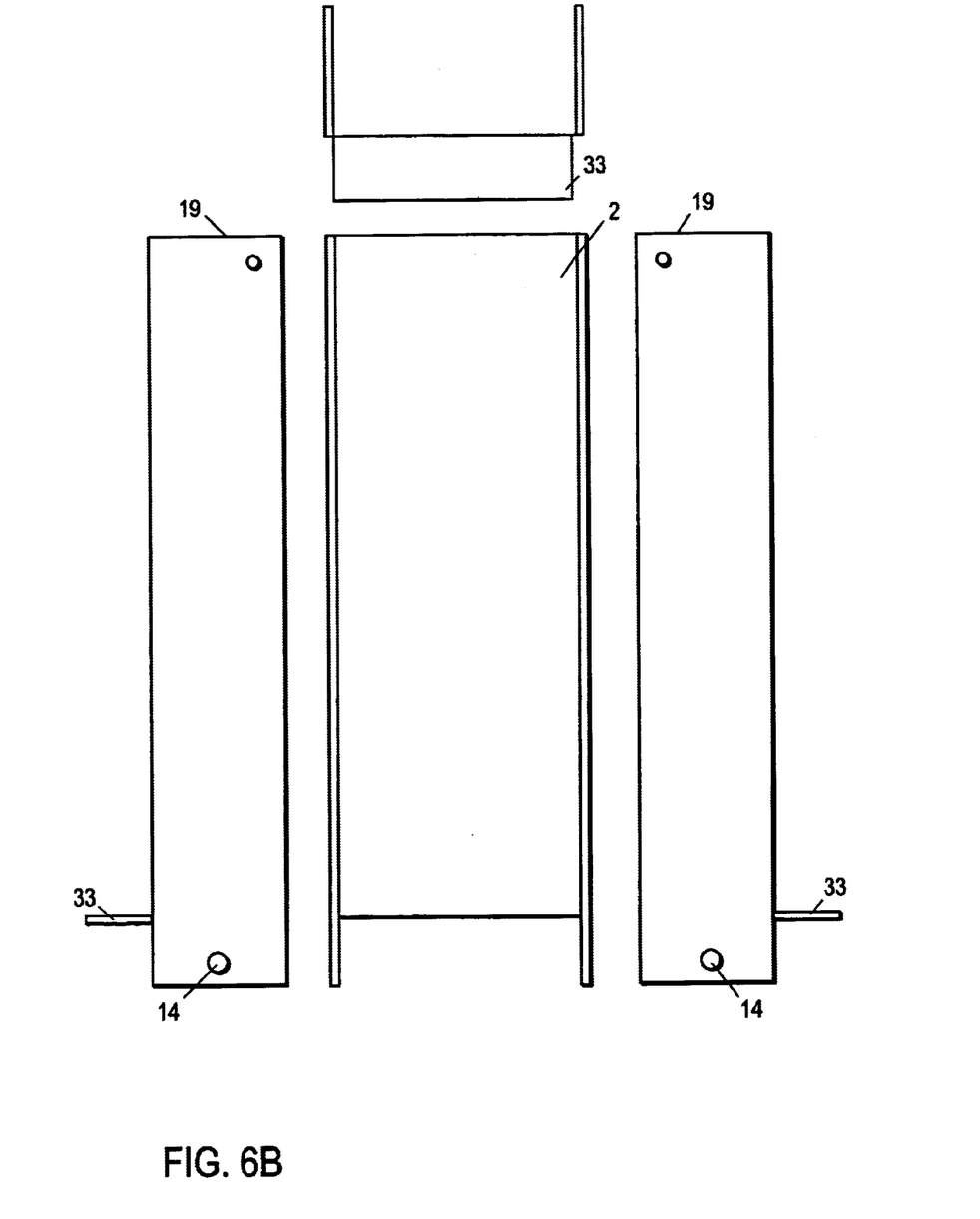
FIG. 6b illustrates one embodiment of a mounting plate of a fishing rod holder.

FIG. 6b illustrates one embodiment of a mounting plate 2 of a fishing rod holder. The mounting plate 2 is a channel of a rectangular shape. The mounting plate 2 may be 5/64" thick, 6" long and 2" wide. The height of each side may be 1". On one end, each side of the mounting plate 2 has a hole 14 (e.g., 5/16" in diameter) for a bolt that attaches the mounting plate 2 to the tubular holder 3, as will be discussed in more detail below. In addition, a portion of the bottom end of each side of the mounting plate 2 is unbent (at a 90-degree angle) to form an unbend-stopper 33. The unbend-stopper 33 may be 2" long and ½" wide. On the other end of each side of the mounting plate 2, there is a hole 19 (e.g., 3/16" in diameter) for a bolt that attaches the latch-trigger 4.

Figure 6C:
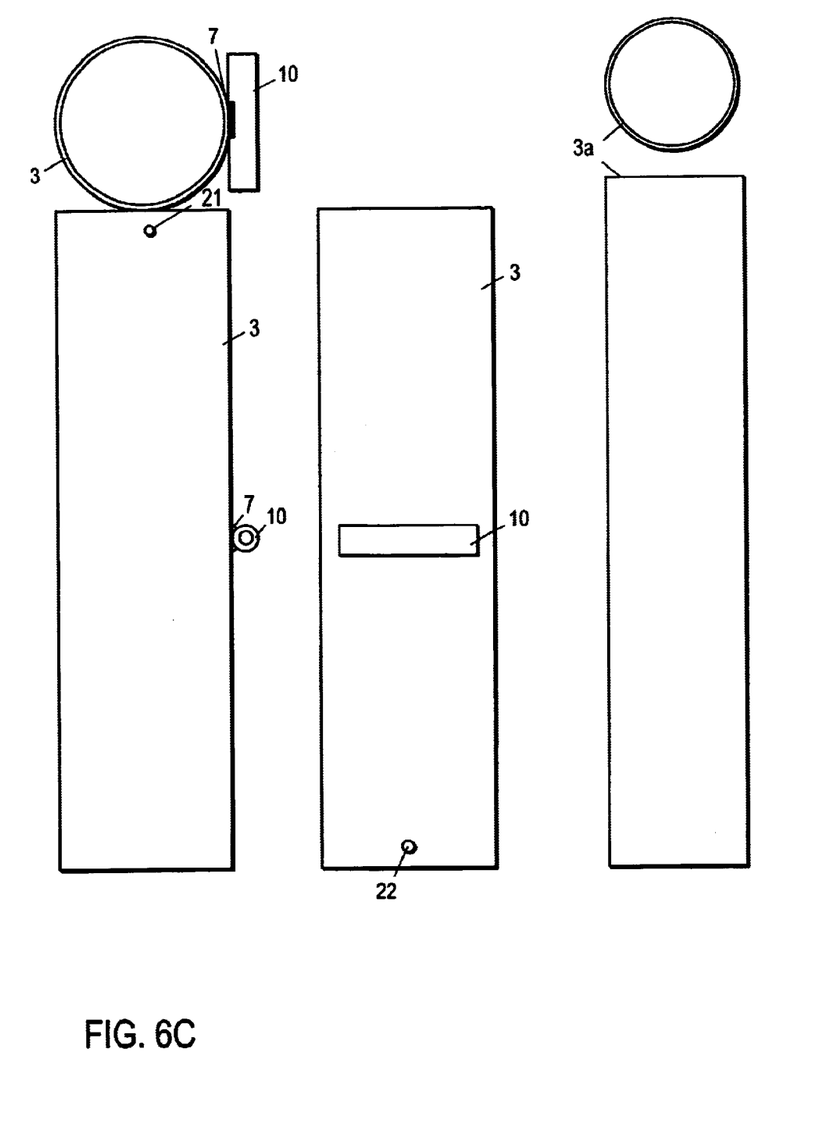
FIG. 6c illustrates one embodiment of a tubular holder of a fishing rod holder.

FIG. 6c illustrates one embodiment of a tubular holder 3 of a fishing rod holder. The tubular holder 3 is a zinced steel tube that may be 1.875" in diameter and 12" in length. The tubular holder 3 (e.g., ¼" from one end) has a hole 21 (e.g., 3/16" in diameter) for a hook that is used to attach the latch-trigger 4. The tubular holder 3 also has at its other end (e.g., ¼" from the end) a through hole 22 for a bolt that attaches the spring 5.

A small tube 10 (e.g., 5/16" in diameter, 1.12" in length, and 1/16" in thickness) is welded (at a 90-degree angle) to the bottom of the tubular holder 3 in its middle part via electric welding 7. The small tube 10 is used for insertion into the mounting plate 2 between the holes 14 of the mounting plate 2. A bolt 11 is then used to pivotally connect the tubular holder 3 with the mounting plate 2.

In one embodiment, a plastic tube 3a (e.g., 1.25"/1.1875" in external/internal diameter) may be inserted into the tubular holder 3 when a fisherman is using a smaller fishing rod.

Figure 6D:
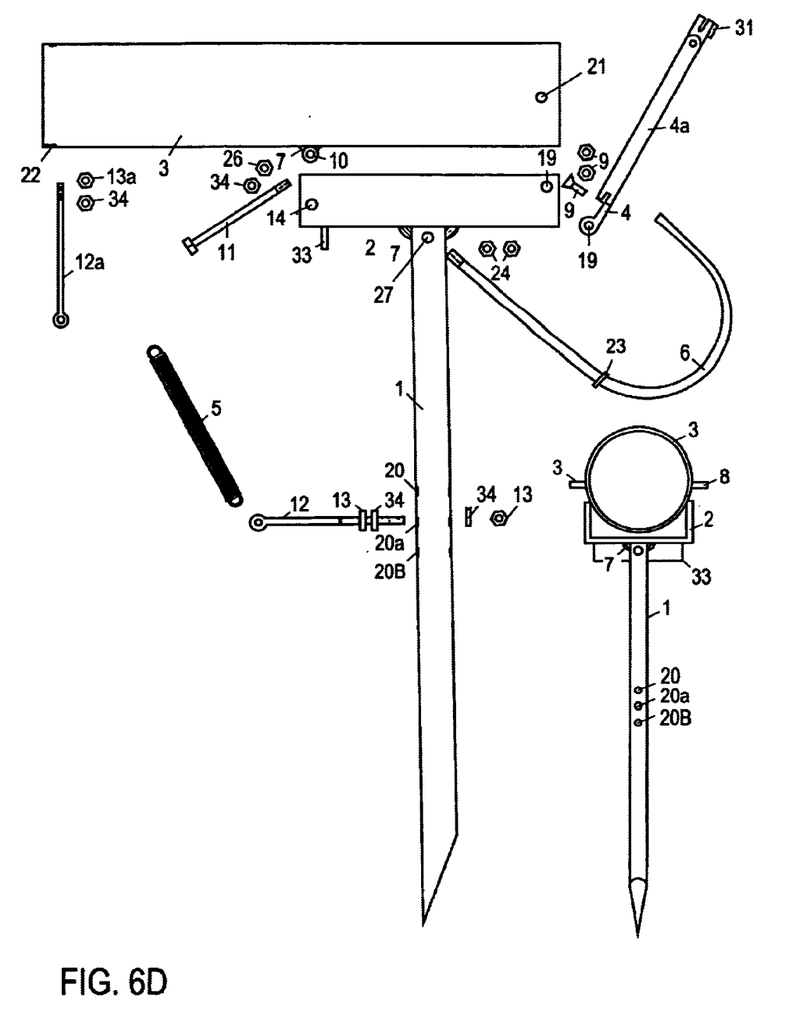
FIG. 6d illustrates exemplary participating elements of a fishing rod holder, according to one embodiment of the present invention.

FIG. 6d illustrates exemplary participating elements of a fishing rod holder, according to one embodiment of the present invention.

Referring to FIG. 6d, the major elements of the fishing rod holder include a metal stake 1, a mounting plate 2, a tubular holder 3, a latch trigger 4, and a safety bracket 6.

The metal stake 1 includes holes 20, 20a and 20b for attaching the spring 5 using a bolt 12. The bolt 12 is a zinced steel bolt (e.g., ¼" in diameter and 2.5" in length) that is to be inserted into one of three holes 20, 20a and 20b. The bolt 12 is fastened on each side of the metal stake 1 by a nut 13 and a disk 34. The front end of the bolt 12 has a hinge to which the lower end of spring 5 is attached. The metal stake 1 also includes a hole 27 at its top part.

The safety bracket 6 is inserted into the hole 27 of the metal stake 1 and is fastened by a nut 24. The safety bracket 6 has a ring-stopper 23 on its longer end at the point at which the bending of the longer end begins.

The tubular holder 3 has a through hole 22 (e.g., 5/16" in diameter) in its rear end, from the top of the tubular holder 3 to the bottom of the tubular holder 3, for a bolt 12a. The bolt 12a is a zinced steel bolt (e.g., ¼" in diameter and 2" in length) that is to be inserted into the hole 22. The bolt 12 is fastened by a nut 13a and a disk 34. The front end of the bolt 12a has a hinge to which the upper end of the spring 5 is attached.

The tubular holder 3 also has a hole 21 on each side. A hook 8 is welded to the hole 21 on each side of the tubular holder 3 via electric welding. The hook 8 is used to attach the latch-trigger 4.

A small tube 10 is welded to the bottom of the tubular holder 3 in its middle part via electric welding 7. The small tube 10 is used for insertion into the mounting plate 2.

The mounting plate 2 is welded to the metal stake via electric welding 7. The mounting plate 2 has a hole 14 in each side, close to its left end, for a bolt 11. The bolt 11 is a zinced steel bolt (e.g., ¼" in diameter and 6" in length) that is to pass through the holes 14 and the small tube 10 inserted between the holes 14. Hence, the bolt 11 pivotally connects the mounting plate 2 with the tubular holder 3. The bolt 11 is fastened by a nut 26 and a disk 34.

The mounting plate 2 has at its bottom end an unbend-stopper 33 which is made by unbending at a 90-degree angle a lower portion of the mounting plate 2. The mounting plate 2 also has a hole 19 to which the latch-trigger 4 is pivotally attached via a bolt 9.

The latch-trigger 4 consists of plates 4 and 4a. Plate 4 has a hole 19 for a bolt 9 which pivotally attaches the latch-trigger 4 to the mounting plate 2. Plate 4 also has an unbend-stopper 31 formed by unbending a top portion of the plate 4 on its right side. The unbend-stopper 31 is used to hold the second plate 4a in a vertical position.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A fishing device comprising:
   a vertical metal stake having a top portion, a bottom portion, and an intermediate portion;
   a mounting plate fixedly attached to the top portion of the vertical metal stake at a generally perpendicular angle, the mounting plate having a first hole close to a left end of the mounting plate and a second hole close to a right end of the mounting plate;
   a tubular rod holder pivotally attached to the mounting plate at the first hole of the mounting plate, the tubular rod holder having a first hole close to a bottom end of the tubular rod holder and a second hole close to a top end of the tubular rod holder, the second hole of the tubular rod holder having attached therein a hook;
   an extendable spring having a first end attached to the intermediate portion of the vertical metal stake and a second end attached to the tubular rod holder via the first hole of the tubular rod holder, the extendable spring allowing a move of the tubular rod holder with a handle of a fishing rod inserted therein from a vertical position, substantially perpendicular to the mounting plate, into a horizontal position, substantially perpendicular to the vertical metal stake;
   a safety bracket made of a steel strip bent into an arch having a front end and a rear end, the safety bracket being pivotally attached to the top portion of the vertical metal stake at a bottom portion of the front end; and
   a latch-trigger having a top portion and a bottom portion, the bottom portion having a cut-out and being pivotally attached to the mounting plate at the second hole of the mounting plate and the top portion having a groove;
   wherein the safety bracket is to be temporarily placed over the tubular rod holder once the tubular rod holder is moved into the horizontal position and to be released after the latch-trigger is fastened to the hook of the tubular rod holder with the cut-out in the latch-trigger; and
   wherein the latch-trigger is released in response to a jerk of a fishing line entered into the groove of the latch-trigger.

2. The fishing device of claim 1 wherein the intermediate portion of the vertical metal stake has a plurality of holes at various levels, each of the plurality of holes causing tension of a certain degree in the extendable spring when the extendable spring is attached to said each of the plurality of holes.

3. The fishing device of claim 1 wherein the tubular rod holder has a steel tube welded to a middle portion of the tubular rod holder, the steel tube being inserted into the mounting plate for pivotally attaching the tubular rod holder to the mounting plate via a bolt.

4. The fishing device of claim 1 wherein the latch-trigger includes two steel plates pivotally connected to each other, a first one of the two steel plates being raised from a folded position upwards when a height of the latch-trigger is to be extended.

5. The fishing device of claim 1 wherein:

the safety bracket is attachable to any one of a front side of the vertical metal stake and a rear side of the vertical metal stake; and the latch trigger is attachable to any one of a front side of the tubular rod holder and a rear side of the tubular folder.

* * * * *

UNITED STATES PATENT AND TRADEMARK OFFICE
CERTIFICATE OF CORRECTION

PATENT NO.    : 6,681,516 B2
DATED         : January 27, 2004
INVENTOR(S)   : Vitaliy Fayerman et al.

It is certified that error appears in the above-identified patent and that said Letters Patent is hereby corrected as shown below:

<u>Title page,</u>
Item [76], Inventors, please remove inventor "Victoria Bezman, Los Angeles, CA."

Signed and Sealed this

Thirteenth Day of April, 2004

JON W. DUDAS
*Acting Director of the United States Patent and Trademark Office*